(12) United States Patent
Strobel

(10) Patent No.: US 11,218,187 B2
(45) Date of Patent: Jan. 4, 2022

(54) FAST ADAPTATION OF VECTORING IN G.FAST

(71) Applicant: Intel Corporation, Santa Clara, CA (US)

(72) Inventor: Rainer Strobel, Munich (DE)

(73) Assignee: MaxLinear, Inc., Carlsbad, CA (US)

(*) Notice: Subject to any disclaimer, the term of this patent is extended or adjusted under 35 U.S.C. 154(b) by 303 days.

(21) Appl. No.: 16/305,625

(22) PCT Filed: May 17, 2017

(86) PCT No.: PCT/US2017/033072
§ 371 (c)(1),
(2) Date: Nov. 29, 2018

(87) PCT Pub. No.: WO2018/004855
PCT Pub. Date: Jan. 4, 2018

(65) Prior Publication Data
US 2020/0336172 A1  Oct. 22, 2020

(30) Foreign Application Priority Data
Jun. 30, 2016 (DE) .......................... 102016112040.5

(51) Int. Cl.
*H04L 27/01* (2006.01)
*H04B 3/32* (2006.01)
(Continued)

(52) U.S. Cl.
CPC ............. *H04B 3/32* (2013.01); *H04B 17/336* (2015.01); *H04M 11/062* (2013.01)

(58) Field of Classification Search
CPC .......... H04B 17/336; H04B 3/32; H04B 3/06; H04B 7/005; H04M 11/06; H04M 11/062;
(Continued)

(56) References Cited

U.S. PATENT DOCUMENTS 6,633,545 B1 * 10/2003 Milbrandt ............. H04L 1/0002
370/252
7,330,433 B2 * 2/2008 Shao ....................... H04L 47/10
370/235

(Continued)

OTHER PUBLICATIONS

International Search Report and Written Opinion dated Jul. 10, 2017 for PCT Application PCT/US2017/033072.
(Continued)

*Primary Examiner* — Phuc H Tran
(74) *Attorney, Agent, or Firm* — Maschoff Brennan

(57) ABSTRACT

A device comprises a memory configured to store, for each one of a plurality of communication lines, an associated relative weight and an associated noise value indicative of a signal-to-noise ratio of transmission on the respective communication line. The device further comprises at least one processor configured to perform an optimization of a transmission precoding parameter for vectored transmission on the plurality of communication lines based on the relative weights and the noise values. The at least one processor is configured to effect the vectored transmission on the plurality of communication lines in accordance with the optimized transmission precoding parameter.

20 Claims, 11 Drawing Sheets

(51) Int. Cl.
*H04B 17/336* (2015.01)
*H04M 11/06* (2006.01)

(58) Field of Classification Search
CPC ............ H04L 1/0001; H04L 25/03343; H04L 25/03968; H04L 27/01; H04L 47/78; H04L 5/0007; H04W 52/04
See application file for complete search history.

(56) References Cited

U.S. PATENT DOCUMENTS

| | | | | |
|---|---|---|---|---|
| 7,876,848 | B2 * | 1/2011 | Han | H04L 1/0009 375/267 |
| 7,899,405 | B2 * | 3/2011 | Han | H04L 1/0029 455/69 |
| 8,295,213 | B2 * | 10/2012 | Wu | H04B 7/0413 370/280 |
| 2007/0211813 | A1 * | 9/2007 | Talwar | H04B 7/0626 375/267 |
| 2008/0159425 | A1 * | 7/2008 | Khojastepour | H04W 72/042 375/260 |
| 2011/0150121 | A1 | 6/2011 | Biyani et al. | |
| 2013/0208579 | A1 | 8/2013 | Strobel et al. | |
| 2013/0215951 | A1 | 8/2013 | Nuzman | |
| 2014/0153630 | A1 * | 6/2014 | Strobel | H04L 25/03343 375/229 |
| 2014/0254791 | A1 * | 9/2014 | Wei | H04M 11/062 379/406.01 |
| 2015/0288811 | A1 | 10/2015 | Kerpez et al. | |
| 2015/0350415 | A1 | 12/2015 | Nuzman et al. | |

OTHER PUBLICATIONS

Strobel, Rainer et al. "Zero-Forcing and MMSE Precoding for G.fast." Globecom 2015—Symposium on Selected Areas in Communicaitons (GC15 SAC). 2015 IEEE. 7 pages.

Strobel, Rainer et al. "Achievable Rates with Implementation Limitations for G.fast-based Hybrid Copper/Fiber Networks." ICC 2015—Symposium on Selected Areas in Communicaitons (ICC15 SAC). 2015 IEEE. 7 pages.

Strobel, Rainer et al. "Discontinuous Operation for Precoded G.fast." 2016 IEEE. 6 pages.

European Patent Application 17726427.2 Office Action dated Sep. 7, 2020.

European Patent Application 17726427.2 Office Action dated May 3, 2021.

* cited by examiner

FAST ADAPTATION OF VECTORING IN G.FAST

REFERENCE TO RELATED APPLICATIONS

This application is a National Phase entry application of International Patent Application No. PCT/US2017/033072 filed May 17, 2017 which claims priority to German Application DE102016112040.5 filed on Jun. 30, 2016, entitled "VECTORING" in the name of Rainer Strobel and is hereby incorporated by reference in its entirety.

FIELD

Various examples relate to performing an optimization of a transmission precoding parameter for vectored transmission on a plurality of communication lines based on noise values associated with the plurality of communication lines. According to examples, the optimization is further based on relative weights associated with the plurality of communication lines.

BACKGROUND

In multi-user transmission over communication lines experiencing inter-line interference/crosstalk, the data rate achievable for data communication on each line is influenced by the transmission on other lines. One example is transmission on communication lines implemented by bundles comprising a plurality of copper cables at comparably high frequencies. Such transmission may be according to the ITU-T G.Fast communication protocol.

Techniques are known to mitigate inter-line crosstalk and to increase the performance of the data communication. This is done by employing a Multi-Input Multi-Output (MIMO) interface comprising a plurality of transceivers. Sometimes, such techniques are referred to as crosstalk cancellation. Here, downstream (DS) transmit signals are pre-distorted such that the interference is canceled or at least significantly reduced. In US (US), the received US signals experiencing crosstalk are processed accordingly to remove or at least significantly reduce the crosstalk.

Scenarios are known where the communication lines suffer from comparably high crosstalk. Here, precoding typically requires to transmit additional compensation signals. Such compensation signals can require additional resources. Typically, this reduces the performance for all users. Similarly, canceling the crosstalk for received US signals can cause additional noise which, in turn, again reduces the overall performance. Both effects depend on the crosstalk coupling.

Typically, the crosstalk coupling is not predictable or only predictable to a limited degree. Therefore, it is difficult to predict the data rates resulting for the data communication on the various lines. This may be in particularly true if data communication on a given communication line newly commences; in such a scenario, the ongoing data communication can be degraded—however, the degree of degradation is difficult to predict.

Such a difficulty in predicting the data rates typically causes problems for the service provider. E.g., if data rates cannot be predicted accurately, it is difficult to provide a guaranteed minimum data rate to subscribers. This may limit the possibility to implement applications which require significant traffic of the data communication and/or low latency. E.g., in a further example, a significant spread of the data rates may result in underfulfillment of a $1^{st}$ subscriber request with respect to data rates and an overfulfillment of a $2^{nd}$ subscriber request with respect to data rates.

Similar problems may also exist on a comparably short timescale. E.g., in a scenario where multiple users on the same cable bundle are subscribed to the same high-performance service, but for most of the time only a small fraction of the available data rates is actually used, this may limit the capability of providing high data rates to the data communication on other communication lines—even though the physical capacity in times of low usage is not exhausted. E.g., when a $1^{st}$ subscriber requests a high data rate, e.g., related to a file download or upload, while the traffic on the other line is low, the subscriber is still limited by the fact that the resources—e.g., in terms of transmit power—are allocated to the various subscriber equally, independent of the current usage of the available resources.

SUMMARY

Therefore, a need exists for advanced techniques of interference mitigation for vectored transmission. In particular, need exists for techniques which overcome or mitigate at least some of the above-identified drawbacks and restrictions.

This need is met by the features of the independent claims. The dependent claims define embodiments.

According to an aspect, a device comprises a memory and at least one processor. The memory is configured to store, for each one of a plurality of communication lines, and associated relative weight and an associated noise value indicative of a signal-to-noise ratio (SNR) of transmission on the respective line. The at least one processor is configured to perform an optimization of a transmission precoding parameter for vectored transmission on the plurality of communication lines based on the relative weights and the noise values. The at least one processor is further configured to effect the vectored transmission on the plurality of communication lines in accordance with the optimized transmission precoding parameters.

According to an example, a method comprises storing, for each one of a plurality of communication lines, and associated relative weight and an associated noise value. The noise value is indicative of an SNR of transmission on the respective line. The method further comprises performing an optimization of a transmission precoding parameter for vectored transmission on the plurality of communication lines. The optimization is performed based on the relative weights and noise values. The method further comprises effecting the vectored transmission on the plurality of communication lines in accordance with the optimized transmission precoding parameter.

According to an example, a computer program product comprises a program code to be executed by at least one processor. Executing the program code causes the processor to perform a method. The method comprises storing, for each one of a plurality of communication lines, and associated relative weight and an associated noise value. The noise value is indicative of an SNR of transmission on the respective line. The method further comprises performing an optimization of a transmission precoding parameter for vectored transmission on the plurality of communication lines. The optimization is performed based on the relative weights and noise values. The method further comprises effecting the vectored transmission on the plurality of communication lines in accordance with the optimized transmission precoding parameter.

According to an example, a computer program comprises a program code to be executed by at least one processor. Executing the program code causes the processor to perform a method. The method comprises storing, for each one of a plurality of communication lines, and associated relative weight and an associated noise value. The noise value is indicative of an SNR of transmission on the respective line. The method further comprises performing an optimization of a transmission precoding parameter for vectored transmission on the plurality of communication lines. The optimization is performed based on the relative weights and noise values. The method further comprises effecting the vectored transmission on the plurality of communication lines in accordance with the optimized transmission precoding parameter.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
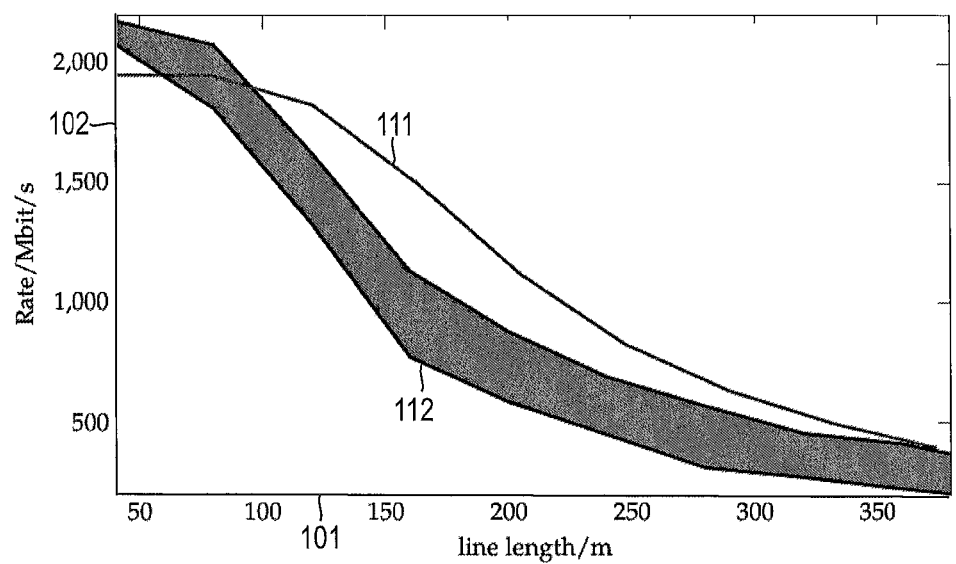
FIG. 1 schematically illustrates a dependency of the data rate on the length of a communication line and further schematically illustrates an uncertainty in predicting the data rate as a function of the length.

In the following, embodiments will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various examples relate to vectored transmission on a plurality of communication lines. E.g., the plurality of communication lines can be arranged in a common cable binder. Transmission on the plurality of communication lines may experience crosstalk between different ones of the communication lines. In various examples, the communication lines are implemented by copper wires.

Transmission on the communication lines can facilitate data communication. Data communication is on a given communication line between two respective end points. Data communication may be in US and/or DS. Data communication may be facilitated by a physical layer 1 on which the communication of symbols is implemented. Data communication may include payload data and may comprise higher layers, e.g., layer 2 or layer 3.

In various examples, different communication protocols can be implemented the transmission on the communication lines and for the data communication. According to an example, the ITU-T G.fast protocol ITU-T G.9701 is implemented. For sake of simplicity, hereinafter, various examples techniques will be described with respect to such an implementation of the G.fast protocol. However, corresponding techniques may be readily applied to other kinds and type of communication protocols such as VDSL, or other xDSL protocols, etc.

Various examples facilitate a connected home and Internet of Things (IoT) applications. This may be due to high data rates achievable for the data communication by the techniques described herein.

Various examples relate to performing an optimization of a transmission precoding parameter. The transmission precoding parameter is typically defined within the vectoring framework. The transmission precoding parameter may define preconditioning of the signal at the transmitter before transmission. As such, the transmission precoding parameter may be a signal gain and/or a vectoring precoding coefficient. E.g., the vectoring precoding coefficient may change the phase of the signal to be transmitted. Different transceivers—associated with different ones of the plurality of communication lines—can transmit and/or receive (transceive) using different values of the transmission precoding parameter. The optimization may provide, as an optimization result, the values of the transmission precoding parameter for the sending and/or receiving (transmission) on each one of the plurality of communication lines.

It is possible that the optimization is based on a value indicative of a crosstalk between the various communication lines. The value indicative of the crosstalk between the various communication lines is sometimes referred to as crosstalk channel or crosstalk channel matrix. It is possible that the optimization is based on alternative or additional input parameters such as SNR and/or relative weights.

The particular implementation of the optimization is not germane for the functioning of the techniques described herein as long as the optimization can handle the relative weights. E.g., numerical optimization may be employed. E.g., genetic optimization may be employed. E.g., a simplex algorithm or a derived technique may be employed. E.g. an optimization technique according to Strobel, Rainer, Andreas Barthelme, and Wolfgang Utschick. "Zero-Forcing and MMSE Precoding for G. fast." 2015 IEEE Global Communications Conference (GLOBECOM). IEEE, 2015 may be employed. E.g., an optimization technique according to Strobel, Rainer, Michael Joham, and Wolfgang Utschick. "Achievable rates with implementation limitations for G. fast-based hybrid copper/fiber networks." 2015 IEEE International Conference on Communications (ICC). IEEE, 2015 may be employed.

Generally, the optimization may provide the transmission precoding parameter in an optimized manner with respect to one or more optimization criteria, sometimes also referred to as optimization target. An example optimization criterion is the overall data throughput of data communication across the plurality of communication lines. A further example optimization criterion is the variance of the data rates associated with the plurality of communication lines. Small variances can be preferred.

According to example scenarios, the optimization considers relative weights associated with the various communication lines. E.g., each communication line may have an associated relative weight. The set of relative weights across the plurality of communication lines may thus be indicative of the relative importance of each one of the plurality of communication lines within the optimization and with respect to the further communication lines. E.g., those communication lines having a comparably large relative weights (small relative weights) associated therewith, may obtain a value of the optimized transmission precoding parameter which results in a higher data rate (smaller data rate) of the respective data communication. Thus, the techniques may be referred to as weighted spectrum optimization. Such weighted spectrum optimization enables to assign different priorities to different subscribers by means of the relative weights; thereby, the achievable data rates can be tailored according to the needs of the individual subscribers.

Such techniques enable to increase the data rates associated with individual subscribers. In particular, such techniques enable to flexibly increase the data rates associated with individual subscribers if further subscribers do not fully utilize resources on their respective communication lines.

In some examples, the relative weights may be predetermined. E.g., the relative weights may be received from a network management system (NMS) via a backbone interface. Thereby, the relative weights may be determined in accordance with certain decisions taken by the network operator. In other examples, the relative weights may be determined based on properties of the transmission on the respective communication line. E.g., in some examples it is possible that the relative weights are determined based on a traffic load of data communication on the plurality of communication lines. In some examples, the determining of the relative weights may comprise performing of a further optimization.

The techniques may be implemented on different time scales. E.g., a long timescale may be associated with different service classes into which the various subscribers/the data communication on the communication lines are grouped. Then, the techniques described herein enable to make the achievable data rates of data communication more predictable. E.g., if a given subscriber does not achieve the predicted data rate due to strong interference on the respective communication line, according to various examples, it is possible to use resources on the other communication lines to increase the data rate of that subscriber. This is achieved by choosing the relative weights appropriately. In further examples, if one or more subscribers request a high-performance service on a communication line suffering from significant crosstalk while other subscribers perform transmission on a communication line suffering from comparably weak crosstalk—but do not fully use the resources allocated to them—, those resources can be moved towards the subscriber requesting the high-performance on the weak line. This is again achieved by choosing the relative weights appropriately. Thereby, the demand for higher data rates can be met. Such adjustments may be comparably static. E.g., such adjustments may be associated with interference properties of the communication lines such as length, position in the cable binder, etc. Such properties typically do not change on a short timescale.

On a short timescale, it is also possible to tailor the data rates. Here, it is possible to achieve high peak data rates on a given communication line in a scenario where the remaining communication lines in the cable bundle temporarily experience a low traffic load of the data communication. In response to a change in the traffic load, it is possible to use a transmission precoding parameter having been derived from an optimization subject to an appropriate set of different relative weights. Then, the resources can be moved from a first subscriber to a second subscriber on-the-fly, e.g., within a transmission frame of the transmission protocol. Further, the techniques enable to tailor the data rate such that the power consumption can be reduced.

In traditional xDSL systems, e.g., VDSL2, the used frequencies are low and the achievable data rate of the data communication mainly depends on the SNR or line attenuation, which again depends on the length and type of cable. Here, it is typically possible accurately predict the data rate based on knowledge of the SNR of the communication line. There is only a small or no dependency between the achievable data rate on one communication line and the traffic on other communication lines, especially when crosstalk cancelation by means of vectoring is used.

The subject techniques are based on the finding that when implementing the transmission at higher frequencies, e.g., above 20 MHz such as in the case of G.fast, the spread of data rates for the same SNR—i.e., same type of communication line, same cable type, and/or same length—is significant. This is caused by the different crosstalk conditions on each of the communication line. This is illustrated in FIG. 1.

FIG. 1 illustrates the predicted data rate 102 as a function of length 101 of the communication line. The length 101 is inversely proportional to the SNR. The crosstalk-free data rates 111 can be accurately predicted as a function of line length (full line in FIG. 1). However, what is observed on the G.fast system with high crosstalk and crosstalk cancelation is the shaded area 112. The data rates 111 may vary substantially. The corresponding spread or variance is not known a-priori. Thus, the effective data rate 102 cannot be predicted accurately.

Figure 2:
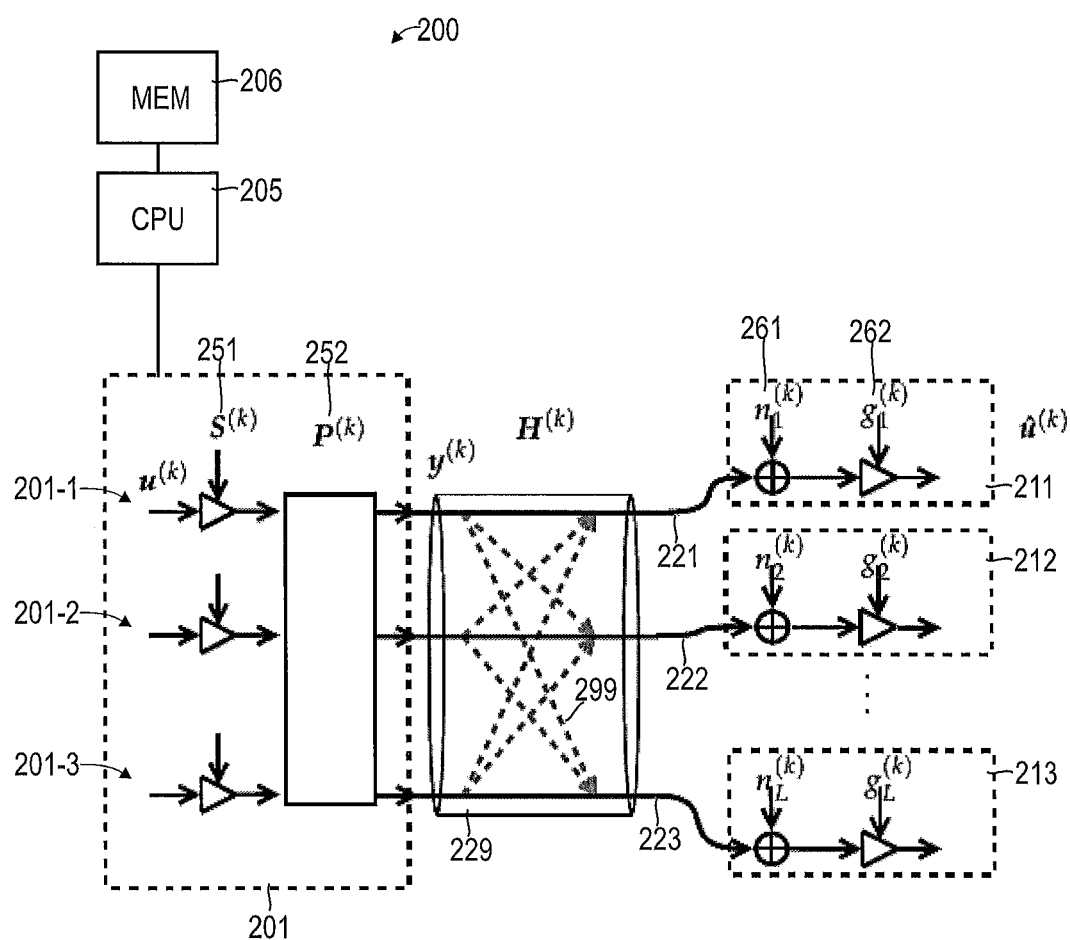
FIG. 2 schematically illustrates a communication system configured for vectored transmission according to various embodiments.

FIG. 2 illustrates aspects with respect to a communication system. The system comprises a device 200 implementing a G.fast DPU. The device 200 comprises a memory 206, e.g., a non-volatile memory. The device 200 further comprises a processor 205. E.g., the processor 205 may be an application-specific integrated circuit or a programmable integrated circuit.

The device 200 further comprises a transceiver stage 201 implementing a plurality of transceivers 201-1-201-3. Each transceiver 201-1-201-3 is associated with a given communication line 221-223. Each transceiver 201-1-201-3 is configured to perform transmission on the respective communication line 221-223.

Interference on the various communication lines 221-223 is caused by crosstalk 299. The communication lines 221-223 are arranged in a common cable bundle 229. Therefore, the crosstalk 299 is significant.

The system further comprises a plurality of devices 211-213 implementing customer premises equipment (CPE).

The block diagram represents one carrier of a multi-carrier system with carriers k=1, ..., K and multiple lines l=1, ..., L. The data signals $u^{(k)}=[u_1^{(k)}, \ldots, u_L^{(k)}]$ for L users shall be transmitted. The data signals encode data.

In the first step, each of them is scaled with the scale factors $S^{(k)}=\mathrm{diag}(S_1^{(k)}, \ldots, S_L^{(k)})$, also referred to as signal gain 251. Then, the signal precoding, represented by $P^{(k)}$ is performed, which creates a combination of all input signals at the outputs $y^{(k)}=[y_1^{(k)}, \ldots, y_L^{(k)}]^T$. The precoding employs a precoding coefficient 252 having different values for each communication line 211-223.

At the precoder output, there is a certain power budget for each line. The sum power over all carriers for line l is limited to a maximum per-line power $p_{sum}$ $$\Sigma_{k=1}^K E[y_l^{(k)}] \leq p_{sum} \qquad (1)$$

and the transmit power is limited by a spectral mask, represented by a power limit per carrier k to be $p_{mask}^{(k)}$ $$E[y_l^{(k)}] \leq p_{mask}^{(k)} \ \forall \ k=1, \ldots, K \qquad (2)$$

where $E[y_l^{(k)}]$ is the transmit power on line l and carrier k.

Generally, the optimization may consider a spectrally-resolved power mask as a constraint. Alternatively or additionally, a maximum power may be considered as a constraint by the optimization.

The signal $y^{(k)}$ is transmitted over the respective communication line 221-223 and experiences a channel $H^{(k)}$ subject to the crosstalk 299. The receive signals $\hat{u}_l^{(k)}$ are recovered with an equalizer $g_l^{(k)}$ 262 in presence of noise $n_l^{(k)}$ 261 The noise is zero-mean with the variance $E[|n_l^{(k)}|^2]=\sigma^2$ and the transmit signal $u^{(k)}$ is assumed to have unit power $E[|u_l^{(k)}|^2]=1$.

The operation of each transceiver 201-1-201-3 is described by $$y^{(k)}=P^{(k)}S^{(k)}u^{(k)} \qquad (3)$$

and the transmission over the channel and the receiver is described by $$\hat{u}^{(k)}=G^{(k)}(H^{(k)}y^{(k)}+n^{(k)}) \qquad (4)$$

The performance on each line l and carrier k is described by the signal-to-noise ratio $SNR_l^{(k)}$ which gives the ratio between the signal power and the error power $$SNR_l^{(k)} = \frac{E[|u_l^{(k)}|^2]}{E[|e_l^{(k)}|^2]} \qquad (5)$$

where the error is $$e_l^{(k)}=\hat{u}_l(k)-u_l^{(k)}. \qquad (6)$$

Other measures for the SNR are conceivable. For zero-forcing preceding, where the following condition is satisfied $$G^{(k)}H^{(k)}P^{(k)}S^{(k)}=I, \qquad (7)$$

the signal-to-noise ratio is given by $$SNR_l^{(k)} = \frac{1}{|g_l^{(k)}|^2 \sigma^2} \qquad (8)$$

There are multiple signal paths from $u_l^{(k)}$ to $\hat{u}_l^{(k)}$. A direct path via $y_l^{(k)}$ and multiple crosstalk paths for signals traveling from $u_l^{(k)}$ over the precoder $p_{ld}^{(k)}$ to $y_d^{(k)}$, where d≠l and over the crosstalk coupling $h_{dl}^{(k)}$ in the channel from $y_d^{(k)}$ to $\hat{u}_l^{(k)}$.

Depending on the scaling factor $S_1^{(k)}, \ldots, S_L^{(k)}$ 251, individual signal paths can be amplified or attenuated while maintaining the power constraints according to Eqs. (1) and (2).

Furthermore, it is possible to modify the precoder matrix $P^{(k)}$ to improve the signals for individual lines, e.g., by a weighted MMSE precoder, see Strobel, Rainer, Andreas Barthelme, and Wolfgang Utschick. "Zero-Forcing and MMSE Precoding for G. fast." 2015 IEEE Global Communications Conference (GLOBECOM). IEEE, 2015.

A certain transceiver l 201-1-201-3 and carrier k may be switched off completely for data transmission, e.g., $u_l^{(k)}=0$ such that the corresponding output $y_l^{(k)}$ can be used completely for enhancement of other lines.

The general concepts of spectrum optimization are known from Strobel, Rainer, Michael Joham, and Wolfgang Utschick. "Achievable rates with implementation limitations for G. fast-based hybrid copper/fiber networks." 2015 IEEE International Conference on Communications (ICC). IEEE, 2015 and Strobel, Rainer, Andreas Barthelme, and Wolfgang Utschick. "Zero-Forcing and MMSE Precoding for G. fast." 2015 IEEE Global Communications Conference (GLOBECOM). IEEE, 2015 explaining sum-rate optimization.

The transmit gains $S^{(k)}$ are selected with respect to the optimization criteria and the power constraints $$\max S^{(k)}, k=1 \ldots, K \sum_{l=1}^L R_l \qquad (9)$$

$$\text{s.t.} \sum_{k=1}^K E[y_l^{(k)}] \leq p_{sum}$$

$$\text{s.t.} \ E[y_l^{(k)}] \leq p_{mask}^{(k)} \ \forall \ k=1, \ldots, K$$

Furthermore, Strobel, Rainer, Michael Joham, and Wolfgang Utschick, "Achievable rates with implementation limitations for G. fast-based hybrid copper/fiber networks." 2015 IEEE International Conference on Communications (ICC). IEEE, 2015 explains that carriers may be switched off in case that the SNR is insufficient to carry at least one bit.

For each carrier k, the procedure starts with all lines active, $I^{(k)}=\{1, \ldots, L\}$. Assuming there is a carrier k, where at least one line does not satisfy $SNR_l^{(k)}>SNR_{min}$, the weakest line is removed from the set of active lines $I^{(k)}$. In the first step, the line $i_{min}$ with minimum SNR is identified $$i_{min}=\arg\min_{i \in I^{(k)}} SNR_i^{(k)} \qquad (10)$$

and in a second step, it is removed from the set of active lines $$I^{(k)} = \{I_{old}^{(k)} / i_{min}\}. \tag{11}$$

In the third step, the precoder is updated such that only crosstalk between active lines is canceled.

Eq. (10) as well as Eq. (11) result in a situation where the sum of data rates is maximized, while no individual line is preferred.

According to example techniques, instead of Eq. 11 the following optimization is implemented $$\max S^{(k)}, k = 1 \ldots, K \sum_{l=1}^{L} w_l R_l \tag{12}$$

$$\text{s.t.} \sum_{k=1}^{K} E[y_l^{(k)}] \le p_{sum}$$

$$\text{s.t.} \quad E[y_l^{(k)}] \le p_{mask}^{(k)} \forall k = 1, \ldots, K$$

with the relative weights $w_1, \ldots, w_L$ for each communication line 221-223. Eq. 12 generally corresponds to Eq. 9. However, the additional relative weights are considered. By means of the relative weights, it is possible to give some lines a higher priority and consider this priority when optimizing, e.g., for the overall data throughput as optimization criterion. Thus, the overall data throughput is considered as the optimization criterion in view of the relative weights.

Furthermore, replacing Eq. (10) by $$i_{min} = \arg \min_{i \subset I^{(k)}} w_l \log(\text{SNR}_i^{(k)}), \tag{13}$$

avows to switch the carriers of low priority lines, first.

In an example, the optimization of transmission precoding parameter is implemented by iterative solving. E.g., the data rate expected for a given transmission precoding parameter—i.e., signal gain 251 and/or precoding coefficient 252—can be determined. If they fulfill a predetermined threshold, the transmission precoding parameter is used for vectored transmission. Otherwise, the weights may be adjusted and optimization of the transmission precoding parameter may be performed with the adjusted transmission precoding parameter. Here, it is possible to adjust the weights $w_l$ such that the data rates are optimized.

Figure 3:
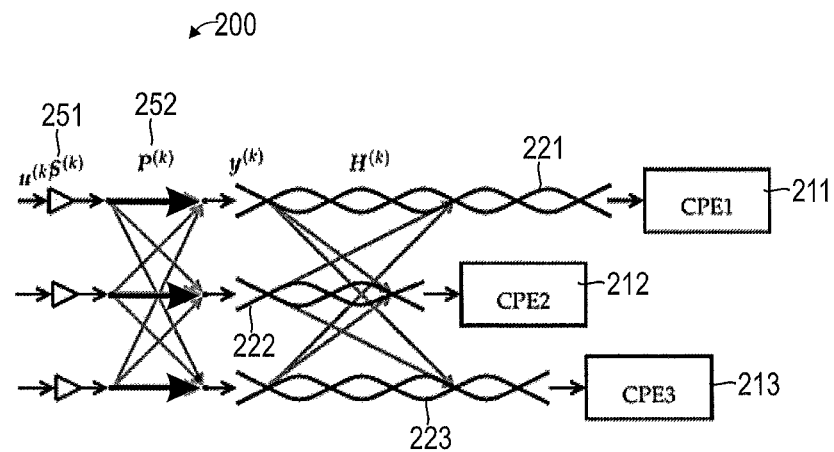
FIG. 3 schematically illustrates the vectored transmission for the communication system according to FIG. 2 in greater detail.

FIG. 3 illustrates the communication system comprising a distribution point unit (DPU) 200 according to an example implementation. Here, the three communication lines 221-223 have different lengths and thus provide different SNRs. E.g., transmission on the communication line 221 will experience the lowest SNR, because the communication line 221 has a longer length if compared to the communication lines 222, 223. Traditionally, it is expected that the performance of data communication—and with it the data rate—will be lowest for the communication line 221.

According to reference implementations, due to the different lengths of the communication lines 221-223, it is not possible to allocate the same performance to each subscriber. Therefore, rate equalization—e.g., maximizing the minimum data rate of data communication on the communication lines 221-223 of the cable bundle 299—is not expected to provide a good result. This is because such rate equalization not only increases the data rate on the weak communication lines, but also reduces the data rate on the strong communication lines to the level of the weak communication lines. Such an equalization is typically not desired.

An important information for the network operator is that the highest data rate can be offered to a certain subscriber (in the example of FIG. 3 typically the subscriber associated with the communication line 222). In reference implementations, the data rates of data communication on all communication lines 221-223 are observed with a fixed transmission precoding parameter and the corresponding services are offered to the subscriber. E.g., this may result in the subscriber associated with the communication line 221 not being able to subscribe to a fast service—independent of the rate requirements of the other users.

According to various examples, based on the relative weights, it is possible to flexibly adjust the achievable data rates and thereby offer more flexibility in the maximum data rates offered to the various subscribers.

E.g., a scenario is conceivable where the subscribers associated with the data communication on the communication lines 222, 223 are not interested in achieving a high data rate—while the subscriber associated with the communication line 221 would in fact prefer subscription to high data rates. Using a weighted spectrum optimization as explained above, it is possible to enhance the performance of the data communication on the communication line 221 while reducing the performance of the data communication on the communication lines 222, 223 to some extent. To achieve this, the relative weights are adjusted accordingly. In some examples, even such an adjustment of the performance of the data communication on the various communication lines 211-213 is accurately predictable such that the target data rates can be reliably met.

Figure 4:
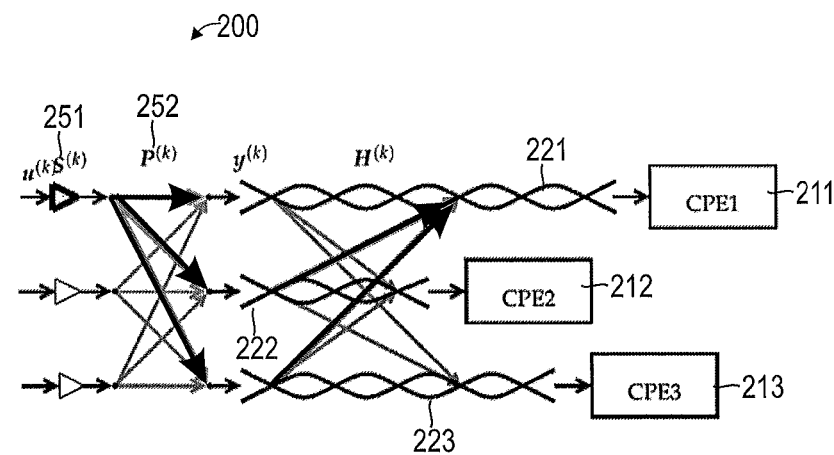
FIG. 4 schematically illustrates the vectored transmission for the communication system according to FIG. 2 in greater detail.

FIG. 4 illustrates the communication system comprising the DPU 200 according to an example implementation. The example implementation according to FIG. 4 illustrates the capabilities of the optimization based on the relative weights to adjust the available data rates of data communication according to the demands of the particular subscriber.

Each communication line 221-223 achieves a certain data rate $R_1, \ldots, R_L$. Without applying the relative weights 221-223, these data rates are fixed according to the respective transmission precoding parameter. By applying the relative weights $w_1, \ldots, w_L$, the data rate of each line $l$ depends on these relative weights, e.g., $R_l(w_1, \ldots, w_L)$. The relative weights may be selected within a certain range $w_{min} \le w_l \le w_{max}$.

To a given subscriber, a comparably higher data rate $R_{max,l}$ can be offered, which is $R_{max,l} = r(w_l = w_{max}, w_{d \ne l} = w_{min})$ depending on the current usage of the cable binder. In the example of FIG. 4, the transmission on the communication line 221 is associated with weight $w_1 = 2$ and the transmission on the communication lines 222, 223 are associated with weights $w_2 = w_3 = 1$, respectively.

Figure 5:
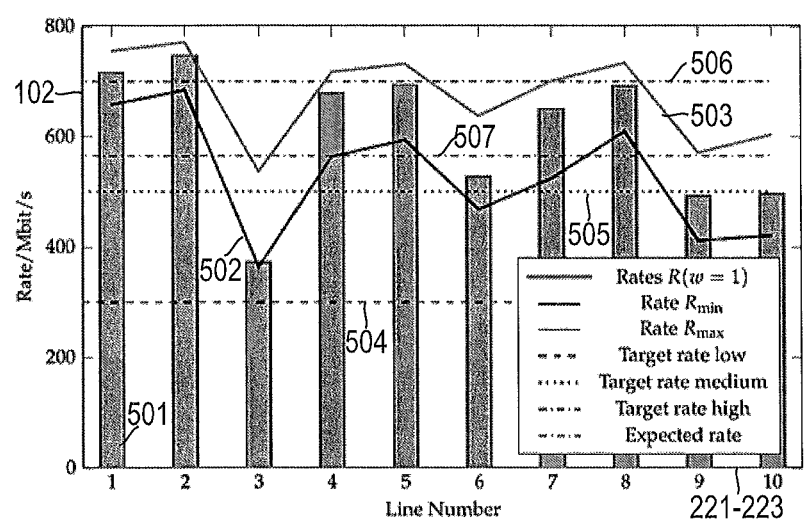
FIG. 5 schematically illustrates the data rate for various communication lines according to various embodiments.

FIG. 5 illustrates results of the weighted spectrum optimization. FIG. 5 illustrates the data rate 102 that can be achieved for different communication lines 221-223 (in the example of FIG. 5 the cable bundle comprises 10 communication lines). In the example of FIG. 5, it is assumed that all communication lines have the same length of 200 meters. In the example of FIG. 5, the network operator offers three target data rates of 300 Mbit/s (scenario "low"; dashed line 504), 500 Mbit/s (scenario "medium"; dotted line 505) and 700 Mbit/s (scenario "high"; dashed-dotted line 506).

The expected data rate from a single-line model is 546 Mbit/s (dashed-dotted line 507). Applying conventional techniques this would result in the services "low" and "medium" being offered to all 10 subscribers associated with the communication lines illustrated in FIG. 5. Service "high" could not be offered.

However, a scenario is observed with the subscribers 3, 9 and 10 do not meet the predicted target rate due to crosstalk. When applying non-weighted spectrum optimization with respect to the overall data rate as the optimization criterion and performing a precise measurement of the data rates, a more comprehensive estimation of the achievable data rates is obtained (filled bars 501). The estimation is associated with uncertainty (full lines 502, 503 in FIG. 5). From this, it can be concluded that the subscribers 1, 2 can be served with the service "high", the subscribers 4-8 can be served with the service "medium", and the subscribers 3-10 can be served with the service "low".

Such a strict association can be replaced by a more flexible allocation of data rates/services to the various subscribers according to the techniques described herein. A weighted spectrum optimization enables to tailor the achievable data rates depending on user needs. It has been observed that by considering relative weights it is possible to offer the service "medium" to all subscribers and the service "high" to 6 subscribers. This may be achieved by implementing the transmission on certain communication lines 221-223 with a relative weight $w_x=2$ and on other communication lines with the relative weight $w_y=1$. Therefore, using the relative weights in the optimization allows to assign services to the subscribers with respect to the requested data rates, rather than with respect to the channel conditions only.

In some examples, it is possible that the relative weights are fixedly predetermined. Then, it may not be possible or only possible to a limited degree to vary the achievable data rates by adjusting the relative weights. However, according to other examples, it is also possible that the relative weights are determined. Here, the computation of the relative weights may be executed by the processor 205 of the DPU 200; in other examples, it is also possible that the computation of the relative weights is executed by another entity of the network such as a central NMS.

Figure 6:
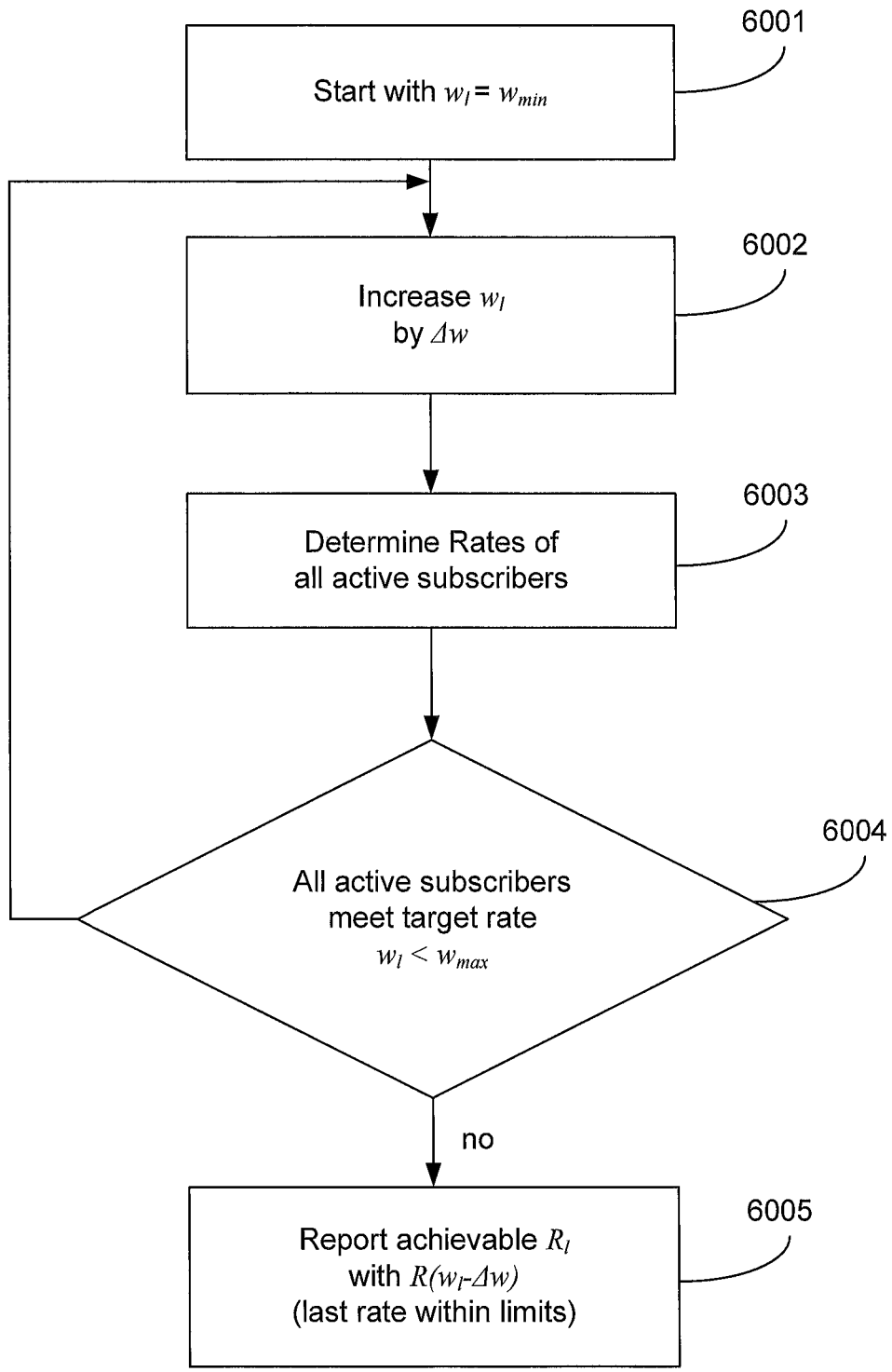
FIG. 6 is a flowchart of a method of determining the data rates according to various embodiments.

FIG. 6 is a flowchart of a method of determining the relative weights. FIG. 6 illustrates an example implementation of adjusting the relative weights to meet the requirements of certain target data rates. The technique of FIG. 6 may be labeled as a further optimization of the relative weights.

It is assumed that the following information is known to determine the relative weights: The target rates $R_{target,l}$ of all communication lines 221-223 and the current data rates $R_l(w)$ of all communication lines 221-223.

At 6001, the method commences by using a seed set of relative weights. The seed set may be based on relative weights which ensure minimum guaranteed data rates associated with the subscribers. E.g., the seed set may have equal relative weights for all communication lines 221-223.

The rate margin $R_{m,l}=R(w)-R_{target,l}$ of all communication lines is calculated.

At 6002, the weights are iteratively adjusted from iteration i iteration t+1 as follows $$w_l^{[t+1]} = \begin{cases} w_l^{t+1} + \Delta w & \text{for } R_{m,l} < \frac{1}{L}\sum l = l^L R_{m,l} \\ w_l^{t+1} - \Delta w & \text{otherwise} \end{cases} \quad (14)$$

Thus, the weights are increased for some communication lines 221-223 and decreased for the remaining communication lines 221-223. In other implementations, the relative weights may be adjusted only for pairs of the communication lines, thereby reducing complexity of each individual adjustment.

To ensure the upper and lower bound to the weights, the updated relative weight is limited according to $$w_l^{t+2} \begin{cases} w_{max} & \text{for } w_l^{[t+1]} \geq w_{max} \\ w_{min} & \text{for } w_l^{[t+1]} \leq w_{min} \\ w_l^{[t+1]} & \text{otherwise} \end{cases} \quad (15)$$

Then, the transmission precoding parameter is determined by performing the respective optimization based on the adjusted relative weights. The optimized transmission precoding parameter is applied and the transmitter and receiver is updated accordingly. Thus, the further optimization of the relative weights may comprise performing the optimization of the transmission precoding parameter. The data rates employing the transmission precoding parameter determined based on the adjusted weights are measured at 6003.

It is checked whether all data rate requests such as minimum data rate, maximum data rate, and/or average data rate are met using the current transmission precoding parameter, 6004.

If not, 6002 and 6003 are repeated. If yes, it is possible to report the achievable data rates according to the current transmission precoding parameter, e.g., using control signaling via a backbone interface and to a NMS. Then, a vectored transmission in accordance with the optimized transmission precoding parameter is effected.

Such a technique enables to implement a comparably slow adjustment of the data rate. This may be applied to improve service quality of all subscribers and to average out rate fluctuations due to high variations of the link quality of individual subscribers.

In some examples, it is possible that the relative weights and the associated transmission precoding parameters are stored for a plurality of corresponding sets, each set corresponding to a given iteration of block 6002. Thereby, a plurality of sets of relative weights, each set comprising an associated relative weight for each communication line, may be obtained. The optimization may thus be performed to yield the transmission precoding parameter of each set. Then, it is possible to dynamically switch between different configurations of the transmission precoding parameters if the data rate needs to be adjusted on a short timescale e.g., timescale within which the determining of the achievable data rates at block 6003 is not possible. It is possible then to select at least one given precoding parameter which has been obtained by the optimization of at least one given set. E.g., said selecting may be based on current traffic loads associated with the data communication on the plurality of communication lines.

An example of a comparably short timescale—within which switching between different transmission precoding parameters associated with different relative weights can be implemented—corresponds to the duration of a transmission frame implemented by the transmission protocol. The duration may be 10 ms or shorter, or 1 ms or shorter, or 0.5 ms or shorter.

Figure 7:
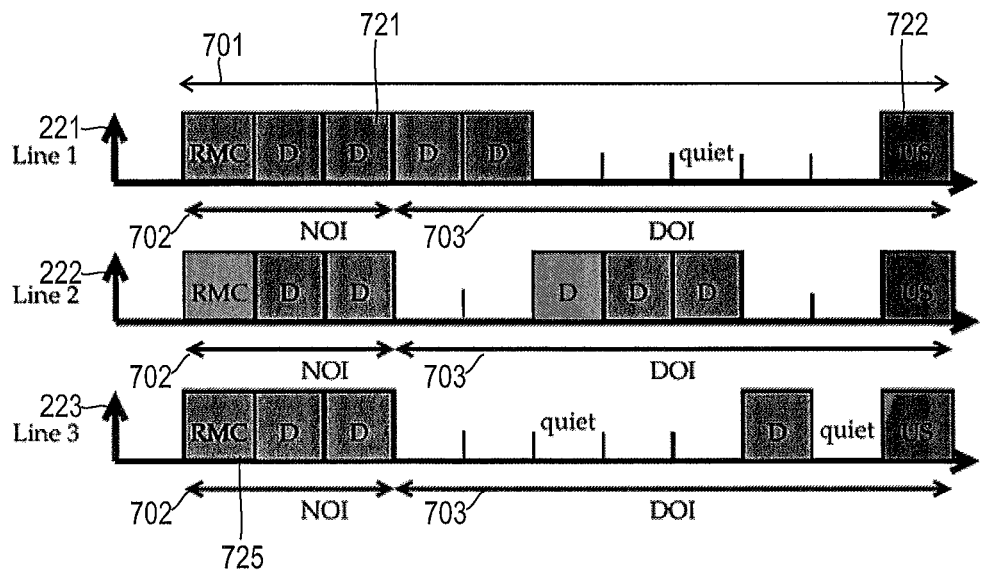
FIG. 7 schematically illustrates a transmission frame used for data communication on a plurality of communication lines according to various embodiments.

FIG. 7 schematically illustrates aspects with respect to a transmission frame 701. In particular, FIG. 7 illustrates the transmission frame 701 for the G.fast protocol. G.fast implements transmission of US data and DS data according to time-division duplexing (TDD). A certain number of DS symbols 721 is transmitted on the DS channel. After a snort time gap, a certain number of US symbols 722 is transmitted on the US channel (for simplicity, FIG. 7 does not show details with respect to the US section of the transmission frame 701). This is again followed by a short time gap.

In detail, the transmission frame 701 starts with a special DS symbol, the RMC symbols 725. Then, symbols 721 which are encoding DS data (DS symbols 721) are transmitted.

The transmission frame 701—in detail, the DS section of the transmission frame 701, as well as the US section of the transmission frame 701—in the example of FIG. 7 is partitioned two slots, i.e., the normal operation interval (NOI) 702 and the discontinuous operation interval (DOI) 703. In other examples, the transmission frame 701 may be partitioned into more than two slots, e.g., three slots, four slots, etc.

The NOI 702 implements continuous data communication across the plurality of communication lines 221-223; while the DOI 703 implements discontinuous data communication across the plurality of communication lines 221-223. Hence, during the NOI 702, data is communicated via the plurality of transceivers 201-1-201-3 on each one of the plurality of communication lines 221-223.

The DOI 703 may facilitate reduction of energy consumption in a scenario where the traffic load is comparably low. If there is no data to be transmitted on a certain communication line 221-223, the discontinuous data communication facilitates interruption of any transmission, including padding or zero-filling. Transmission can then be stopped during the DOI depending on the current traffic load. Thereby, the transceivers can be temporarily switched to an idle state during the discontinuous data communication. Differently, during the NOI 702, data communication on all communication lines 221-223 is active. Data symbol are transmitted on all communication lines at the same point in time.

In an example, during the DOI 703, a time-division multiple access (TDMA) scheme is implemented for the transmission on the plurality of communication lines 221-223. This results in the possibility of implementing transmission on a given communication line 221-223 exclusively—i.e., without potentially interfering transmission on one or more further communication lines sharing the same cable binder. This, generally, facilitates achieving higher data rates when transmitting during the DOI 703.

Figure 8:
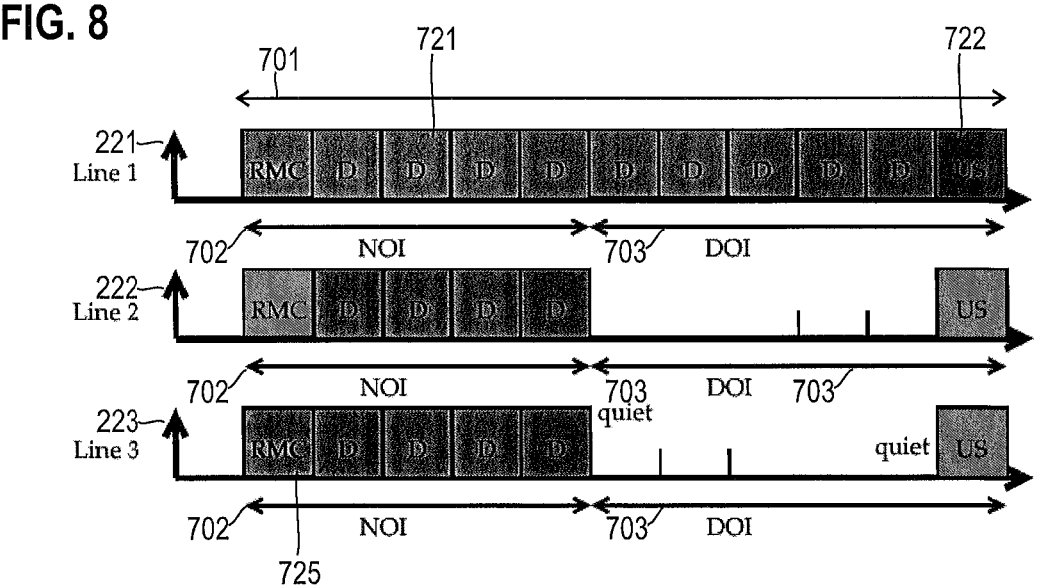
FIG. 8 schematically illustrates a transmission frame used for data communication on a plurality of communication lines according to various embodiments.

According to various examples, the resource allocation during the transmission frame 701 is re-allocated. FIG. 8 illustrates aspects with respect to the resource allocation of a transmission frame 701. Here, during the DOI 703, data symbols 721 are exclusively communicated on the communication line 221. The communication lines 222, 223 do not perform data communication during the DOI 703.

Such a reconfiguration of the resource allocation can be implemented on a short timescale, e.g., less than 10 milliseconds, preferably less than 5 milliseconds, more preferably not more than 1 millisecond. Thereby, it becomes possible to react quickly on changes in the traffic load. E.g., if the user starts a video stream or starts a file upload/download, this may be appropriately reflected in the change of the resource allocation.

Figure 9:
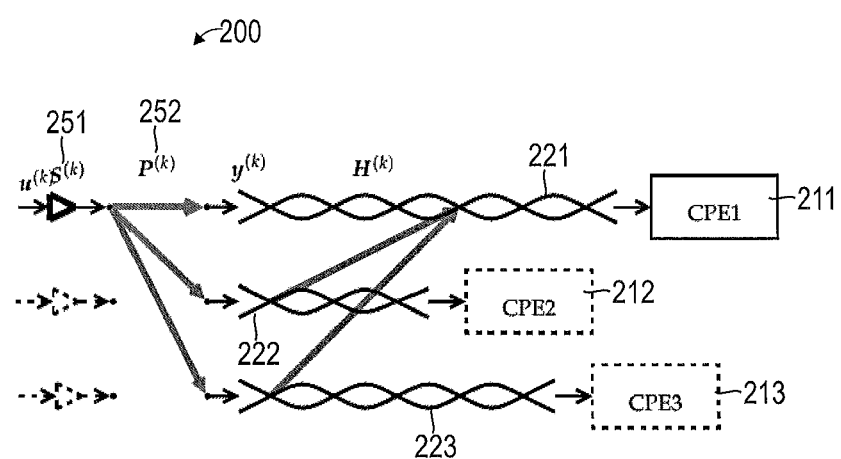
FIG. 9 schematically illustrates vectored transmission for the communication system according to FIG. 2 in greater detail.

According to various examples, it is possible that those transceivers 201-2, 201-3 that are not implementing data communication on the associated communication line 222, 223 facilitate beamforming of the vectored transmission on the communication line 221. This is schematically illustrated in FIG. 9.

Hence, instead of shutting down the transceivers 201-2, 201-3 of the communication lines 222, 223 on which data is not communicated during the DOI 703, these transmitters 201-2, 201-3 are controlled to perform a vectored transmission to thereby improve the data rate on the active communication line 221. To achieve this, the transmission precoding parameter may be set accordingly; in particular, different transmission precoding parameters may be used during the NOI 702 and the DOI 703. E.g., in one example, the precoding coefficient during the DOI 703 may have an amplitude value set to 1 for the communication lines 222, 223 on which data communication during the DOI 703 is riot implemented; the phase value may be set to appropriate values for the communication lines 222, 223 with respect to transmission on the communication line 221. This corresponds to said beamforming.

In one example, such an approach corresponds to setting the relative weights associated with the communication lines 222, 223 to zero during the DOI 703, while setting the relative weight associated with the communication line 221 to a finite value. In a further example, this corresponds to performing the optimization to meet the power constraints according to equations 1 and 2 using the specific setting of the precoding coefficient as outlined above as a further constraint.

At the transceiver 201-1-201-3, there is one full precoder matrix $P_{NOI}^{(k)} \in C^{L \times L}$ of size L×L for each carrier. It is used during the NOI 702 to cancel crosstalk between all communication lines 221-223. During the DOI 703, the number of communication lines 221-223 that is enabled in at the same time is lower. Therefore, the inputs to the precoder, representing the communication lines 221-223 with active data transmission, is less than $L_n^{[t]} < L$. In the DOI 703, multiple precoder coefficient sets of $P_{DOI}^{(k),[t]} \in C^{L \times L_n^{[t]}}$ are stored. There is a number of T such precoders.

One special implementation is T=L+1 and $L_\alpha - 1 \forall l = 2, \ldots, T$, where one such precoder DOI precoder column is stored for each communication line 221-223 and only for the NOI 703 (t=1) lines are active. This gives the highest peak rates $R_{peak,l}$ for the respective 221-223. But only one subscriber at a time can use the peak performance.

Such a specific implementation according to the beamforming approach is not necessary in all scenarios. In some scenarios, it is possible that during the NOI 700 and to the first optimize transmission precoding parameter derived from the optimization of a first set of relative weights is used for the vectored transmission; while during the discontinuous operation interval 703 a second optimize transmission precoding parameter derived from the optimization of a second set of relative weights is used. Therefore, it is possible to switch between different transmission precoding parameters—corresponding to different sets of relative weights—within a given transmission frame 701. In such a scenario, it is generally possible that also during the DOI 703 data communication is implemented on all or at least some of the communication lines 221-223; while, according to the difference in the used transmission precoding parameters underlying different sets of relative weights, a prioritization of the data communication can be implemented.

While above various examples with respect to switching between different transmission precoding parameters have been illustrated in the framework of the NOI 702 and the DOI 703, generally, such techniques can be also implemented with respect to other timeslots. It is not mandatory to rely on VOI 702 and DOI 703. E.g., in one example, it could be possible to switch between subsequent transmission frames 701. In other examples, it could be possible to implement continuous data communication during the entire transmission frame 701 and to switch between different transmission precoding parameters from transmission frame 701 to the transmission frame 701 or between different slots of the transmission frame 701 implementing continuous data communication.

Figure 10:
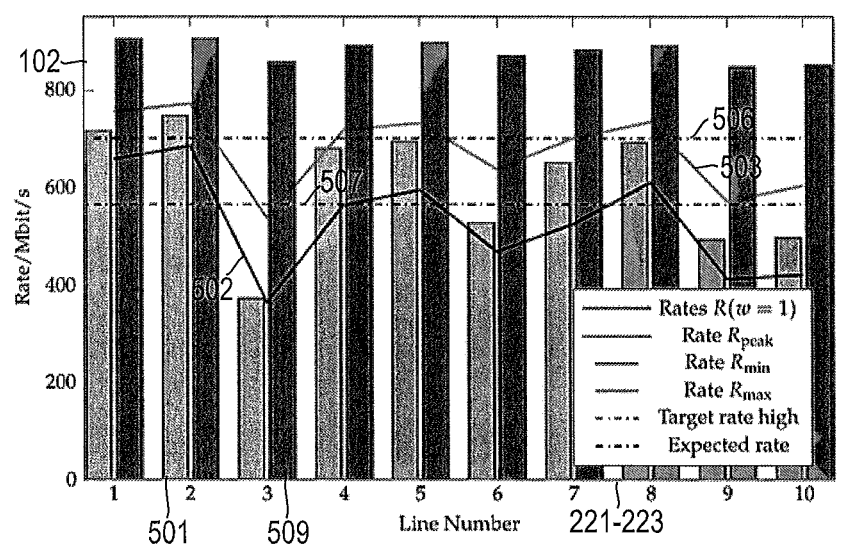
FIG. 10 schematically illustrates the data rate for various communication lines according to various embodiments.

FIG. 10 generally corresponds to FIG. 5. Additionally, in FIG. 10, the maximum data rate 509 achievable by a beamforming approach as outlined above is illustrated for the various communication lines 221-223.

Figure 11:
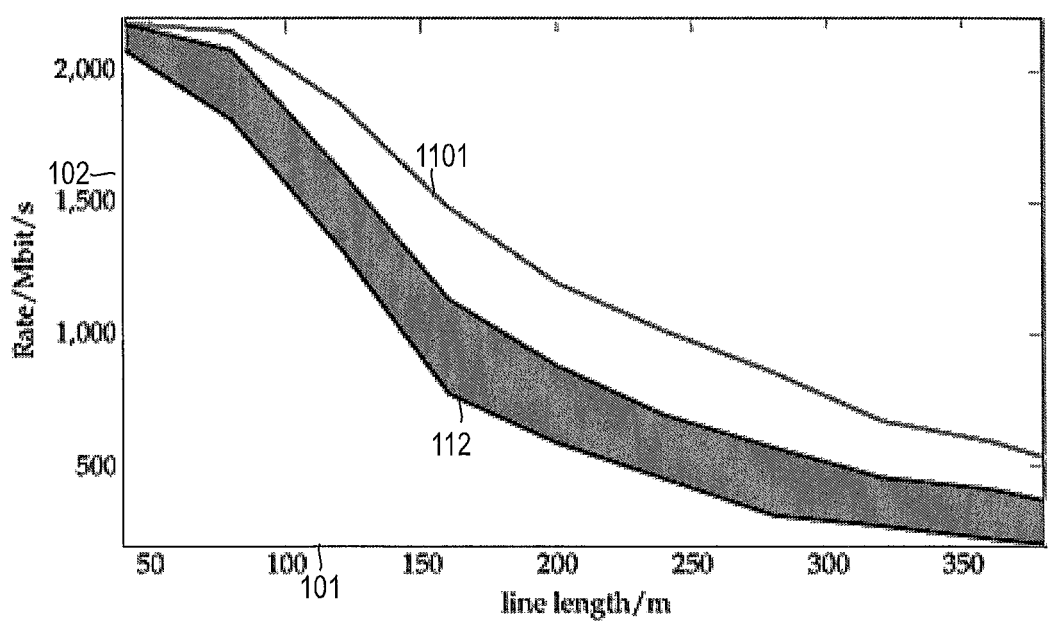
FIG. 11 schematically illustrates a dependency of the data rate on the length of the communication line and further schematically illustrates an uncertainty in predicting the data rate as a function of the length.

FIG. 11 generally corresponds to FIG. 1. Here, the maximum data rate 509 achievable by the beamforming approach is illustrated along with the rate spread 112.

In some examples, it is possible to determine the length of the NOI 702 and the length of the DOI 703. Here, the minimum guaranteed data rates associated with the subscribers of the plurality of communication lines 221-223, peak data rates, and/or traffic loads associated with the data communication can be taken into account.

Hereinafter, an example implementation of finding the optimal number of symbols of the NOI 702 and the optimal number of symbols of the DOI 703—and thereby the lengths thereof—are illustrated. In the non-limiting example following hereinafter, a linear program is provided.

Here, the peak data rates according to FIG. 10 are collected in a matrix R according to $$R = \begin{bmatrix} R_{NOI,1} & R_{peak,1} & 0 & \cdots & 0 \\ R_{NOI,2} & 0 & R_{peak,2} & \cdots & 0 \\ \vdots & & & \ddots & \vdots \\ R_{NOI,L} & 0 & 0 & \cdots & R_{peak,L} \end{bmatrix} \quad (16)$$

Furthermore, a transmit time vector $t \in R^{L+1}$ $t \in \mathbb{R}^{L+1}$ with L+1 elements is introduced. It shall satisfy $\Sigma_{i-1}^{L|T} t_i \leq 1$ and $t_i \geq 0 \forall i=1, \ldots, L+1$ and determines the fraction of the TDD frame that is used for NOI (t=1) or the corresponding user in DOI (e.g. t=2 is user 1 only, t=3 is user 2 only, . . . ).

The actual data rates $R_{act}$ of each line are $$R_{act} = R_t \quad (17)$$

There are subscribers which require the full link bandwidth which form a group $I_{max} \subset 1, \ldots, L$. It contains the remaining lines. In most cases, this will be zero or 1 line, because the number of subscribers connected to a DPU 200 is small and peak traffic is only required for a short fraction of time of the day.

For all subscribers, a minimum required rate $R_{min,l}$ is set according to the current traffic requirements or active services, e.g., active IPTV channels. The traffic requirement may be determined by data buffer fill levels or by monitoring the active services on the line.

A linear program is of the form $$\max c^T t \text{ s.t } Rt \geq R_{min} \quad (18)$$

The objective function vector c is selected according to the data rates of the users requesting the peak rate. The rate which is achieved by these users is $$R_{act,l} = R_{NOI,l} t_l + R_{DOI,l} t_{l/l} \quad (19)$$

and correspondingly, maximizing the sum rate of the lines in $I_{max} \subset 1, \ldots, L$ will require the vector c according to $$c_l = \begin{cases} \sum i \in I_{max} R_{NOI,l} & \text{for } l = 1 \\ R_{DOI,l} & \text{otherwise} \end{cases} \quad (20)$$

In case that the rates are weighted with $w_l$, it is given by $$c_l = \begin{cases} \sum i \in I_{max} R_{NOI,l} w_l & \text{for } l = 1 \\ R_{DOI,l} w_l & \text{otherwise} \end{cases} \quad (21)$$

The solution of the linear program will give a set of times $t_1, \ldots, t_{L-1}$ for the transmit time of each line. To derive the actual number of symbols $N_{sym,l}$ to be transmitted for each configuration in a frame with $N_{frame}$ symbols, this is given by $$N_{sym,l}[t_l \times N_{frame}]. \quad (22)$$

A special situation occurs whenever no line requests the peak data rate, i.e., $I_{max} = \{ \}$. This will be the case during long periods of the day, when no one requests very high peak rates.

In this case, the transmit time can be minimized with respect to the required rates $R_{min}$ when the objective for (22) is set to $$c_l = -1 \forall l, \ldots L+1. \quad (23)$$

This allows to achieve high peak rates and a certain power saving at the same time.

For applications, e.g., a cloud network storage, high peak rates for individual users are advantageous, because they allow a very fast reaction on a user action, e.g., opening a file from the cloud storage. Still, other tasks like TV service run with a certain minimum rate that is guaranteed to the users.

Figure 12:
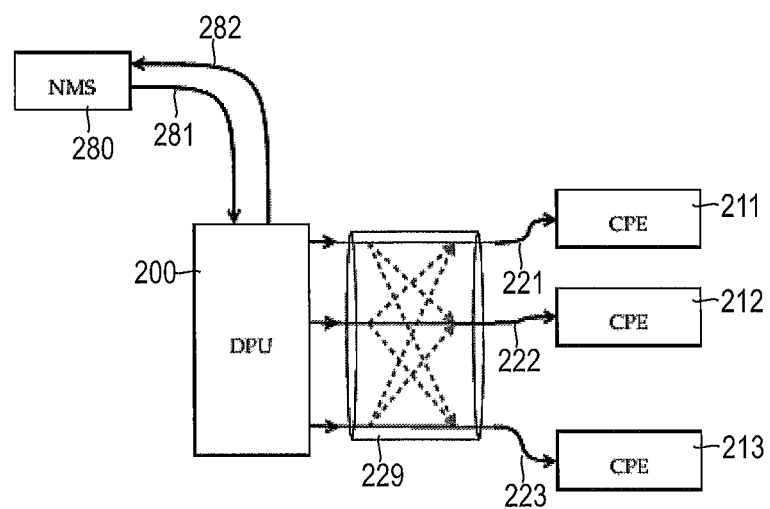
FIG. 12 schematically illustrates a communication system configured for vectored transmission and a network management system in communication with the communication system according to various embodiments.

FIG. 12 illustrates communication of the system 200 via backbone interface with the NMS 280. It is possible that information is exchanged between the NMS 280 and the DPU 200.

E.g., information 282 provided from the DPU 200 to the NMS 280 can include current data rates for the individual communication lines 221-223. Alternatively or additionally, it is possible that the information 228 includes a range of data rates, e.g., the minimum data rate $R_{min,l}$ and/or the maximum data rate $R_{max,l}$ for each communication line 221-223. Alternatively or additionally, it is possible to report the data rate that is achieved with the neutral weight setting where all weights are equal across the plurality of communication lines 221-223, i.e., $R_l(w=1)$.

The information 281 provided from the NMS 280 to the DPU 200 can, in one example, include the relative weights. Alternatively or additionally, it is possible that the relative weights are at least partially determined at the DPU 200. E.g., in one example, the NMS 280 may provide a seed set of relative weights to the DPU 200 which then further adjust the relative weights for the various communication lines 221-223. Alternatively or additionally to communicating a control message from the NMS 280 to the DPU 200 which is indicative of the relative weights, it is possible to send a control message from the NMS 280 to the DPU 200 which is indicative of the target data rates $R_{target,l}$ of the plurality of communication lines 221-223. Then, the DPU 200 can determine the relative weights accordingly, e.g., according to a technique as discussed with respect to FIG. 6.

Alternatively or additionally, it is possible to send a control message from the NMS 280 to the DPU 200 which is indicative of those communication lines 221-223 which may benefit from a peak data rate during the DOI 703. E.g., the control signaling 281 may be indicative of the group $I_{max}$. Furthermore, it is possible that the control signaling 281 is indicative of a lower bound of the data rates implemented on each one of the communication lines 221-223, such that a minimum guaranteed data rate is provided. This may facilitate implementation of certain services such as voice over IP.

Such signaling 281, 282 can be time critical. Therefore, it can be desirable to implement such signaling 281, 282 within the DPU or at a point of the network which is able to communicate with the DPU 200 on a short time scale.

Figure 13:
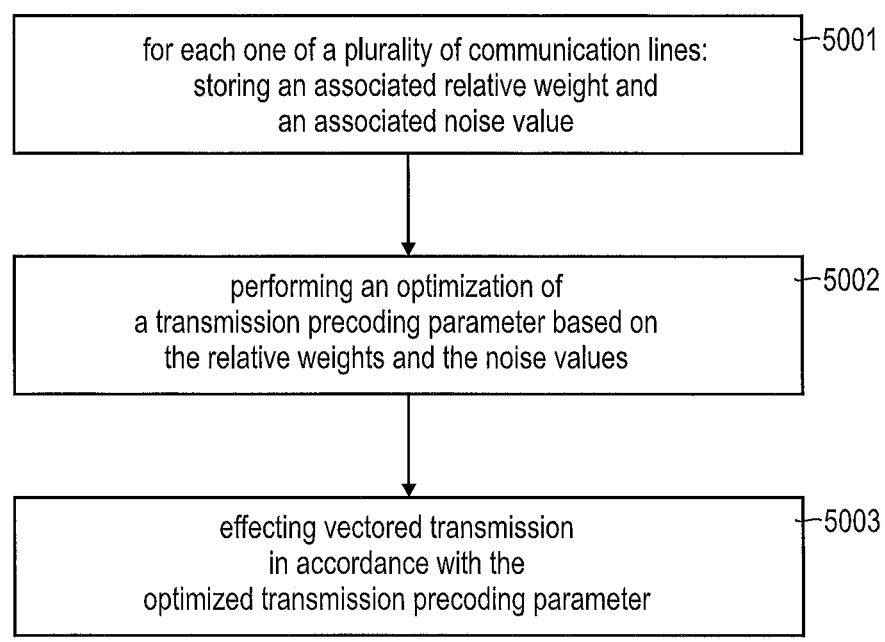
FIG. 13 is a flowchart of a method according to various embodiments.

FIG. 13 is a flowchart of a method according to various embodiments. At block 5001, associated relative weights and associated noise values are stored for each one of a plurality of communication lines 221-223.

At 5002, and optimization of a transmission precoding parameters stored based on the relative weights and the noise values according to block 5001.

Then, vectored transmission is effected in accordance with the optimized transmission precoding parameter at 5003. E.g., block 5003 may involve control signaling 281 from the NMS 280 to the DPU 200 to trigger said communication. The scenario may be applicable where 5001 and 5002 are implemented at the NMS 280. Alternatively or additionally, block 5003 may involve controlling the plurality of transceivers 201-1-201-3 to perform the vectored transmission on the plurality of communication lines 221-223 in accordance with the optimized transmission precoding parameter. Such a scenario may be in particular applicable if blocks 5001 and 5002 are implemented at the DPU 200.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A device, comprising:
a memory configured to store, for each one of a plurality of communication lines, an associated relative weight and an associated noise value indicative of a signal-to-noise ratio of transmission on the respective communication line, wherein each of the associated relative weights are associated with a different data rate for a different subscriber line,
at least one processor configured to perform an optimization of a transmission precoding parameter for vectored transmission on the plurality of communication lines based on the relative weights and the noise values,
wherein the at least one processor is configured to effect the vectored transmission on the plurality of communication lines in accordance with the optimized transmission precoding parameter.

2. The device of claim 1,
wherein the device is a distribution point unit and further comprises:
a plurality of transceivers configured to transceive on the communication lines, wherein the at least one processor is configured to control the plurality of transceivers to perform the vectored transmission on the plurality of communication lines in accordance with the optimized transmission precoding parameter.

3. The device of claim 2, further comprising:
a backbone interface configured to communicate with a network management system,
wherein the at least one processor is configured receive, via the backbone interface, a control message indicative of the relative weights.

4. The device of claim 1,
wherein the memory is configured to store a plurality of sets of relative weights, each set comprising, for each one of the plurality of communication lines, an associated relative weight,
wherein the at least one processor is configured to perform the optimization of the transmission precoding parameter for each set.

5. The device of claim 4,
wherein the at least one processor is configured to select at least one given transmission precoding parameter which has been obtained by the optimization of at least one given set,
wherein said selecting is based on traffic loads associated with data communication on the plurality of communication lines,
wherein the at least one processor is configured to control the plurality of transceivers to perform the vectored transmission on the plurality of communication lines in accordance with the selected at least one given transmission precoding parameter.

6. The device of claim 4,
wherein the at least one processor is configured to control the plurality of transceivers to perform the vectored transmission on the plurality of communication lines in accordance with a first optimized transmission precoding parameter derived from the optimization of a first set during a first slot of a transmission frame of the vectored transmission,
wherein the at least one processor is configured to control the plurality of transceivers to perform the vectored transmission on the plurality of communication lines in accordance with a second optimized transmission precoding parameter derived from the optimization of a second set during a second slot of the transmission frame of the vectored transmission.

7. The device of claim 6,
wherein the first slot of the transmission frame implements continuous data communication across the plurality of communication lines,
wherein the second slot of the transmission implements discontinuous data communication across the plurality of communication lines.

8. The device of claim 6,
wherein the at least one processor is configured to communicate data via the plurality of transceivers on each one of the plurality of communication lines during the first slot of the transmission frame,
wherein the at least one processor is configured to communicate data via a first transceiver of the plurality of transceivers on the respective first transmission line during the second slot of the transmission frame,
wherein the at least one processor is configured to not communicate data via a second transceiver of the plurality of transceivers on the respective second transmission line during the second slot of the transmission frame, wherein the at least one processor is configured to control the second transceiver to perform the vectored transmission in accordance with the second optimized transmission precoding parameter during the second slot of the transmission frame.

9. The device of claim 8,
wherein the second transceiver facilitates beamforming of the vectored transmission of the first transceiver.

10. The device of claim 6,
wherein the at least one processor is configured to determine the lengths of the first slot and of the second slot based on at least one of minimum guaranteed data rates associated with subscribers of the plurality of communication lines, peak data rates associated with the subscribers, and traffic loads associated with data communication on the plurality of communication lines.

11. The device of claim 4,
wherein the at least one processor is configured to determine the relative weights of the plurality of sets by iteratively adjusting the relative weights of a seed set for at least for pairs of the plurality of communication lines.

12. The device of claim 1,
wherein the at least one processor is configured to determine the relative weights based on at least one of minimum guaranteed data rates associated with subscribers of the plurality of communication lines, peak data rates associated with the subscribers, and traffic loads associated with the plurality of communication lines.

13. The device of claim 1,
wherein the at least one processor is configured to determine, for each one of the plurality of communication lines, at least one of a maximum data rate, a minimum data rate, and an average data rate associated with the optimized transmission precoding parameter,
wherein the at least one processor is configured to selectively adjust the relative weights based the at least one of the maximum data rate, the minimum data rate, and the average data rate.

14. The device of claim 13,
wherein the device is a distribution point unit and further comprises:
a backbone interface configured to communicate with a network management system,
wherein the at least one processor is configured to transmit, via the backbone interface, a control message indicative of the at least one of the maximum data rate, the minimum data rate, and the average data rate.

15. The device of claim 1,
wherein the optimization criterion of the optimization is overall data throughput across the plurality of communication lines.

16. The device of claim 1,
wherein the transmission precoding parameter is at least one of a signal gain and a vectoring precoding coefficient.

17. The device of claim 1,
wherein the device is a ITU-T G.Fast distribution point unit.

18. A method, comprising:
storing, for each one of a plurality of communication lines, an associated relative weight and an associated noise value indicative of a signal-to-noise ratio of transmission on the respective line, wherein each of the associated relative weights are associated with a different data rate for a different subscriber line,
performing an optimization of a transmission precoding parameter for vectored transmission on the plurality of communication lines based on the relative weights and noise values,
effecting the vectored transmission on the plurality of communication lines in accordance with the optimized transmission precoding parameter.

19. The method of claim 18, comprising:
controlling a plurality of transceivers to perform the vectored transmission on the plurality of communication lines in accordance with the optimized transmission precoding parameter.

20. A non-transitory computer readable medium comprising a program code to be executed by at least one processor, wherein executing the program code causes the at least one processor to perform a method, comprising:
storing, for each one of a plurality of communication lines, an associated relative weight and an associated noise value indicative of a signal-to-noise ratio of transmission on the respective line, wherein each of the associated relative weights are associated with a different data rate for a different subscriber line,
performing an optimization of a transmission precoding parameter for vectored transmission on the plurality of communication lines based on the relative weights and noise values,
effecting the vectored transmission on the plurality of communication lines in accordance with the optimized transmission precoding parameter.

* * * * *